R. B. H. GOULD.
Piston-Rod Packing.
No. 228,341. Patented June 1, 1880.
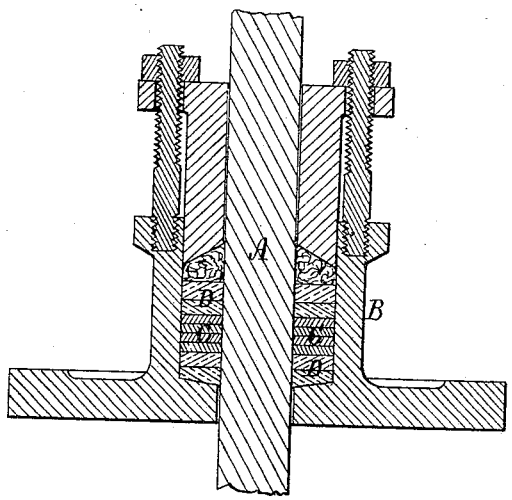
Witnesses.
S. N. Piper
W. W. Lant
Inventor.
Reuben B. H. Gould.
by attorney.
R. H. Eddy

UNITED STATES PATENT OFFICE.

REUBEN B. H. GOULD, OF EAST CAMBRIDGE, MASSACHUSETTS, ASSIGNOR TO HIMSELF AND WALTER W. JONES, OF SAME PLACE.

PISTON-ROD PACKING.

SPECIFICATION forming part of Letters Patent No. 228,341, dated June 1, 1880.

Application filed January 29, 1880.

*To all whom it may concern:*

Be it known that I, REUBEN B. H. GOULD, of East Cambridge, in the county of Middlesex and State of Massachusetts, have invented a new and useful Improvement in Piston or Piston-Rod Packings; and I do hereby declare the same to be described in the following specification, and represented in the accompanying drawing, which is a vertical section of a piston-rod and its stuffing-box provided with my improved packing.

The nature of my invention is duly set forth in the claim hereinafter made.

In such drawing, A denotes a piston-rod, and B a stuffing-box therefor, of ordinary construction. The packing, arranged within the said box and to encompass the rod, I compose of a series of rawhide washers and also of other washers of water-proof material, between which latter washers the said rawhide washers are arranged.

On the upper of the water-proof washers I place a flaxen, cotton, or other suitable wiper or wiping-washer, all being substantially as shown in the accompanying drawing, wherein C is the series of flat annuli or rawhide washers, and D D those of water-proof material. These latter I usually make from waste india-rubber or gutta-percha banding, composed of layers of cloth or canvas and layers of india-rubber or gutta-percha.

The rawhide washers, placed one on the top of the other, are to be saturated with oil, and are to have above, as well as below them, one or more of the water-proof washers.

The wiper is to encircle the piston-rod, and, with the several washers, is to be forced into the stuffing-box by the cap and screws thereof. The water-proof washers serve to retain the oil in the rawhide washers between them and prevent it from being injured by the steam. The wiper is to wipe the piston-rod of any surplus oil, or to keep it within the packing.

Experience has demonstrated that a packing thus made may be in daily use, without injury or requiring oiling of its rawhide portion, for several weeks or even months, and that it will in the meantime properly lubricate the piston-rod. Such packing may also be used in a piston-head and to act against the inner surface of a cylinder within which such piston-head may be employed. A single layer or annulus of rawhide may be used in place of a series thereof; but it is preferable to use more than one layer.

What I claim as my invention is—

The packing, substantially as described, for use as explained, consisting of one or more layers or washers of rawhide, two layers or sets of layers of water-proof material, and a wiper, as set forth, all arranged as represented.

REUBEN B. H. GOULD.

Witnesses:
R. H. EDDY,
W. W. LUNT.